(12) United States Patent
Fritz et al.

(10) Patent No.: US 9,109,482 B2
(45) Date of Patent: Aug. 18, 2015

(54) FRONT END EXHAUST SYSTEM

(71) Applicant: Fisker Automotive and Technology Group, LLC, Costa Mesa, CA (US)

(72) Inventors: Thomas Fritz, Ann Arbor, MI (US); Calvin Lee, Novi, MI (US); Billy Tally, Dove Canyon, CA (US)

( * ) Notice: Subject to any disclaimer, the term of this patent is extended or adjusted under 35 U.S.C. 154(b) by 0 days.

(21) Appl. No.: 13/660,380

(22) Filed: Oct. 25, 2012

(65) Prior Publication Data

US 2013/0146391 A1     Jun. 13, 2013

Related U.S. Application Data

(63) Continuation-in-part of application No. PCT/US2011/034573, filed on Apr. 29, 2011.

(60) Provisional application No. 61/329,208, filed on Apr. 29, 2010.

(51) Int. Cl.
   *F01N 13/08*     (2010.01)
   *F01N 1/02*     (2006.01)

(52) U.S. Cl.
    CPC ..................................... *F01N 1/02* (2013.01)

(58) Field of Classification Search
    USPC .......................... 181/228, 212, 227, 237, 254
    See application file for complete search history.

(56) References Cited

U.S. PATENT DOCUMENTS

| | | | | |
|---|---|---|---|---|
| 3,019,847 A | * | 2/1962 | Abramson et al. | 180/309 |
| 4,589,517 A | * | 5/1986 | Fukuda | 181/265 |
| 5,388,408 A | * | 2/1995 | Lawrence | 60/324 |
| 5,602,368 A | * | 2/1997 | Kaneso | 181/255 |
| 5,783,782 A | * | 7/1998 | Sterrett et al. | 181/272 |
| 7,707,828 B2 | * | 5/2010 | Leseman et al. | 60/316 |
| 8,205,715 B1 | * | 6/2012 | Lai | 181/250 |
| 8,215,450 B2 | * | 7/2012 | Chien | 181/269 |
| 2001/0018995 A1 | * | 9/2001 | Uegane | 181/275 |
| 2005/0067219 A1 | * | 3/2005 | Albertson et al. | 181/240 |
| 2007/0125594 A1 | * | 6/2007 | Hill | 181/256 |
| 2007/0137190 A1 | | 6/2007 | Leseman | |
| 2012/0273299 A1 | * | 11/2012 | Jones et al. | 181/228 |
| 2012/0273302 A1 | * | 11/2012 | Takagaki et al. | 181/228 |

FOREIGN PATENT DOCUMENTS

| | | |
|---|---|---|
| CN | 2490002 Y | 5/2002 |
| CN | 101413417 A | 4/2009 |
| CN | 101460330 A | 6/2009 |
| CN | 101532411 A | 9/2009 |
| CN | 101371018 A | 1/2012 |
| JP | S61-74620 | 5/1986 |
| JP | 2000-247157 A | 9/2000 |

(Continued)

OTHER PUBLICATIONS

International Search Report PCT/US2011/1034573 dated Jul. 27, 2011.

(Continued)

*Primary Examiner* — Forrest M Phillips (57) ABSTRACT

An exhaust system for a hybrid electric vehicle includes an exhaust pipe. The exhaust pipe includes a first channel having a first end coupled to an engine of the vehicle and a second end that splits into a second and third channel. The second and third channels extend outwardly to a first front side and to a second front side of the vehicle.

3 Claims, 7 Drawing Sheets

(56) References Cited

FOREIGN PATENT DOCUMENTS

| | | |
|---|---|---|
| JP | 2002-144888 A | 5/2002 |
| JP | 2003-326980 A | 11/2003 |
| JP | 2005-106052 A | 4/2005 |
| JP | 2007-247565 A | 9/2007 |

OTHER PUBLICATIONS

Office Action dated Aug. 13, 2014, from related Chinese Patent Application No. 201180025400.2, 20 total pages.

Office Action dated Dec. 9, 2014, from related Japanese Patent Application No. 2013-508284, 5 total pages.

* cited by examiner

FRONT END EXHAUST SYSTEM

CROSS-REFERENCE TO RELATED PATENT APPLICATIONS

This application claims priority to PCT application No. PCT/US2011/034573, filed on Apr. 29, 2011, incorporated herein by references in its entirety. This application claims priority to U.S. Provisional Application No. 61/329,208, filed Apr. 29, 2010, incorporated herein by reference in its entirety.

BACKGROUND

1. Field

The present disclosure relates generally to an exhaust system, and more particularly to a front end exhaust system for hybrid vehicles.

2. Related Art

Conventional exhaust systems for internal combustion engines include, among other things, exhaust pipes coupled to a muffler and pipe. Gases from the combustion engine are purged through the exhaust pipes and into the muffler to attenuate and muffle the sound. The gases then exit via the pipe into the atmosphere. Conventional exhaust systems may also include a catalytic converter for cleansing the exhaust gases of harmful emissions prior to entering the atmosphere.

Conventional exhaust systems may be implemented in a variety of vehicles, including hybrid electric vehicles (HEVs). An HEV is a hybrid vehicle that combines a conventional internal combustion engine propulsion system with an electric propulsion system. The inclusion of the electric propulsion system (or powertrain) is intended to enhance the fuel economy of the vehicle. One example of a HEV is the hybrid electric automobile. The hybrid electric automobile typically includes a gasoline internal combustion engine and one or more electric motors powered by batteries.

While conventional exhaust systems may be implemented in HEVs, implementing conventional exhaust systems in HEVs poses a number of challenges. For example, HEVs pose unique challenges in packaging an exhaust system. Packaging a large battery in the middle of the vehicle helps with driving dynamics, but exhaust systems take up large volumes of space and get very hot. Packaging an exhaust system next to a battery can damage the battery and/or reduce the battery's volume and capacity. Packaging the exhaust system elsewhere may result in a reduction in passenger cabin space and adversely include vehicle proportions.

SUMMARY

According to various embodiments, an exhaust system for a hybrid electric vehicle includes an exhaust pipe. The exhaust pipe includes a first channel having a first end coupled to an engine of the vehicle and a second end that splits into a second and third channel. The second and third channels extend outwardly to a first front side and to a second front side of the vehicle, respectively. A first muffler is coupled to the exhaust pipe second channel and a second muffler is coupled to the exhaust pipe third channel. A first outlet pipe is couples to the first muffler and a second outlet pipe is coupled to the second muffler. The exhaust system is located at a front end of the vehicle such that the first and second outlet pipes expel exhaust to the first and second front sides of the vehicle front end.

An exhaust system for a hybrid electric vehicle includes, but is not limited to any one or combination of: an exhaust pipe including a first channel having a first end coupled to an engine of the vehicle and a second end that splits into a second channel that extends outwardly therefrom to a first front side of the vehicle and a third channel that extends outwardly therefrom to a second front side of the vehicle; a first muffler coupled to the second channel of the exhaust pipe and a second muffler coupled to the third channel of the exhaust pipe, wherein the first muffler is coupled to the first front side of the vehicle and the second muffler is coupled to the second front side of the vehicle; and a first outlet pipe coupled to the first muffler and a second outlet pipe coupled to the second muffler. The exhaust system is located at a front end of the vehicle such that the first and second outlet pipes expel exhaust to the first and second front sides of the front end of the vehicle.

An exhaust system for a hybrid electric vehicle includes, but is not limited to any one or combination of: an exhaust pipe including a first channel having a first end coupled to an engine of the vehicle and second end that splits into a second channel that extends outwardly therefrom to a first front side of the vehicle and a third channel that extends outwardly therefrom to a second front side of the vehicle; a first intermediate exhaust pipe having a proximate end coupled to the second channel and a distal end having a first muffler coupled thereto and a second intermediate exhaust pipe having a proximate end coupled to the third channel and a distal end having a second muffler coupled thereto, wherein the first muffler is coupled to the first front side of the vehicle and the second muffler is coupled to the second front side of the vehicle; a first outlet pipe coupled to the first muffler and a second outlet pipe coupled to the second muffler; and at least one heat shield mounted to the exhaust system that deflects heat away from the vehicle thereby protecting the vehicle from heat damage. The exhaust system is completely contained within a front end of the vehicle and in front of a passenger compartment of the vehicle such that the first and second outlet pipes expel exhaust to the first and second front sides of the front end of the vehicle. An exhaust system for a vehicle with an internal combustion engine installed in a front engine bay of the vehicle includes, but is not limited to any one or combination of: an inlet pipe having one end connected to an exhaust port of the internal combustion engine and a second end; an enclosed muffler chamber having a first compartment, a second compartment, and a third compartment, the first compartment in communication with the second end of the inlet pipe for receiving exhaust from the internal combustion engine via the inlet pipe; sound dampening material arranged in the second compartment; a communication pipe arranged through the second compartment to allow exhaust flow from the first compartment to the second compartment and then to the third compartment; a first connection pipe having a first end in communication with the third compartment and a second end; a second connection pipe having a first end in communication with the third compartment and a second end; a first side muffler in communication with the second end of the first connection pipe; and a second side muffler in communication with the second end of the second connection pipe; wherein the inlet pipe includes a plurality of apertures arranged along a portion of the inlet pipe that is arranged in the second compartment to allow exhaust to flow out of the inlet piper through the apertures into the second compartment; and wherein the communication pip includes a plurality of apertures arranged along a portion of the communication pipe that is arranged in the second compartment to allow exhaust to flow through.

An exhaust system for a vehicle with an internal combustion engine installed in a front engine bay of the vehicle includes, but is not limited to any one or combination of: an inlet pipe having one end connected to an exhaust port of the internal combustion engine and a second end; an enclosed muffler chamber having an interior volume; a first connection pipe arranged in the interior volume of the enclosed muffler chamber, the first connection pipe in communication with the second end of the inlet pipe, the first connection pipe has a first end in communication with the interior volume of the enclosed muffler chamber and a second end; a second connection pipe arranged in the interior volume of the enclosed muffler chamber, the second connection pipe in communication with the second end of the inlet pipe, the second connection pipe has a first end in communication with the interior volume of the enclosed muffler chamber and a second end; a neck pipe arranged in the interior volume of the enclosed muffler chamber, the neck pipe having a first end in communication with the inlet pipe, the neck pipe having a second end in communication with the interior volume of the enclosed muffler chamber; a first side muffler in communication with the second end of the first connection pipe; and a second side muffler in communication with the second end of the second connection pipe.

One advantage of the present disclosure is that the exhaust system protects the batteries from damage, such as exhaust heat, or the like. Another advantage of the present disclosure is that the exhaust system resides completely in the front end of the vehicle thereby freeing up space elsewhere in the vehicle. Still another advantage of the present disclosure is that the exhaust system enables packaging flexibility in the rest of the vehicle.

Various embodiments provide a unique configuration of an exhaust system that does not route from the exhaust port of a front mounted engine to the rear of the vehicle. Instead, the exhaust pipes extend outwardly to reach the mufflers located on the sides of the vehicle. The result is a compact and lightweight cold end exhaust system. In addition, such embodiments provide a cold end exhaust system that offers a unique styling feature from the front exit exhaust outlet pipes.

DETAILED DESCRIPTION

Figure 1:
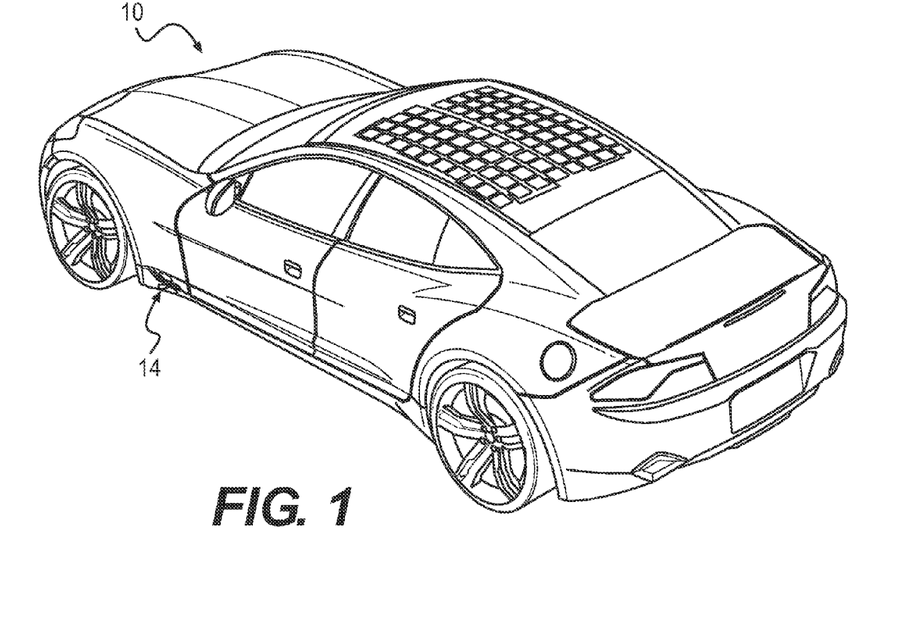
FIG. 1 is a perspective view of a hybrid electric vehicle according to various embodiments of the disclosure.
Figure 2:
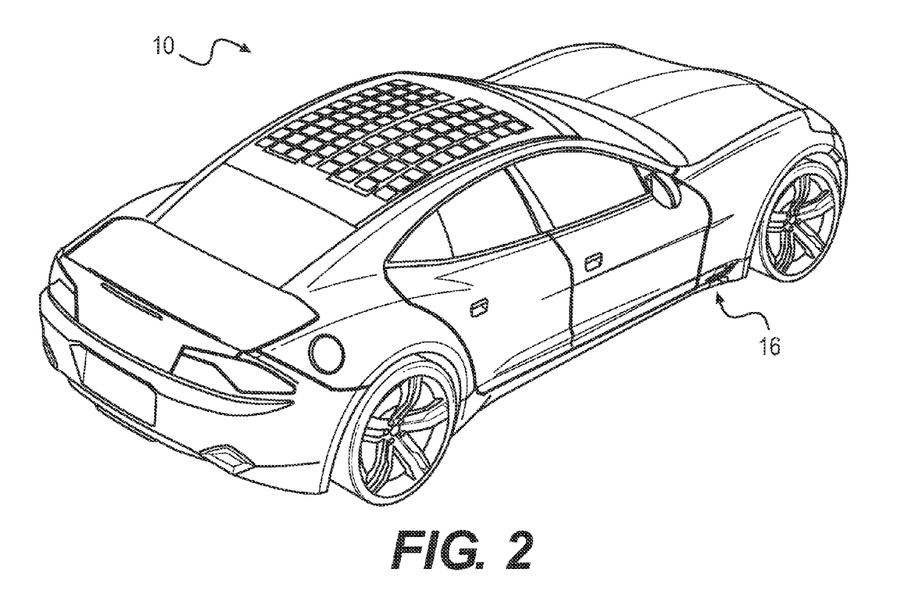
FIG. 2 is a rear perspective view of a hybrid electric vehicle having dual outlet pipes, according to various embodiments of the disclosure.
Figure 3:
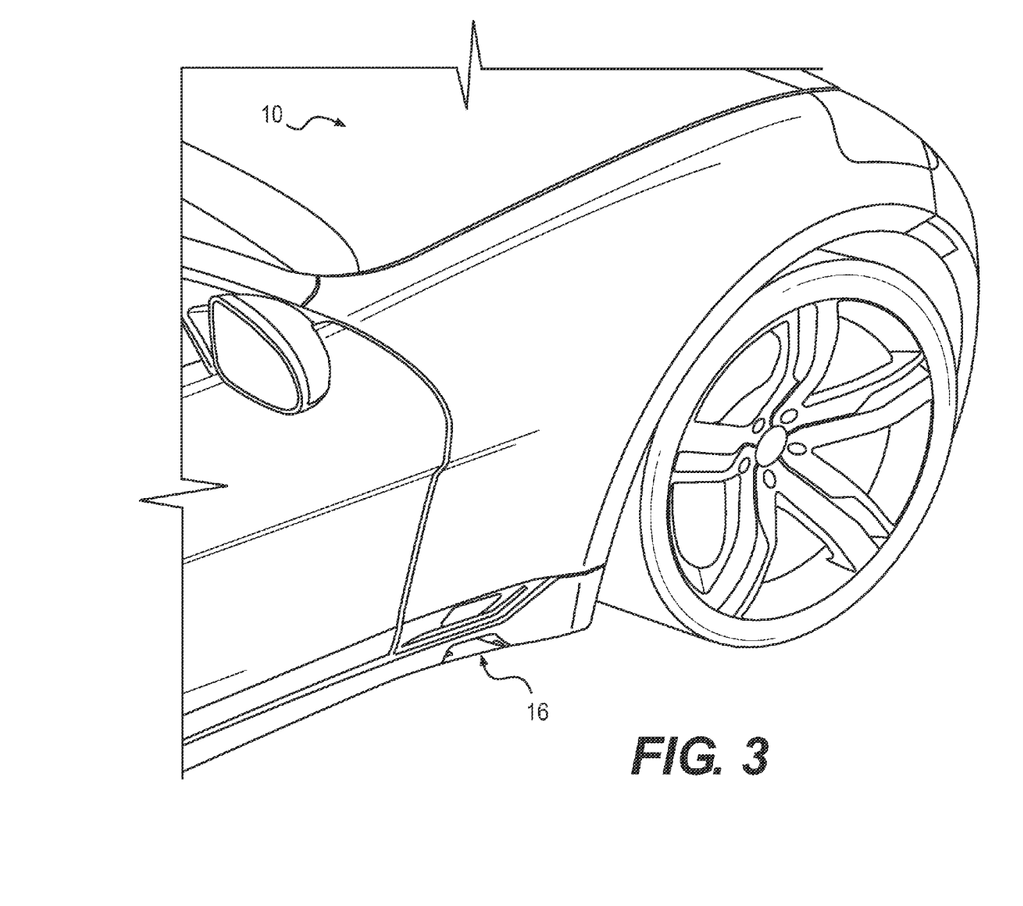
FIG. 3 is a partial enlarged view of the hybrid electric vehicle of FIG. 2.
Figure 4:
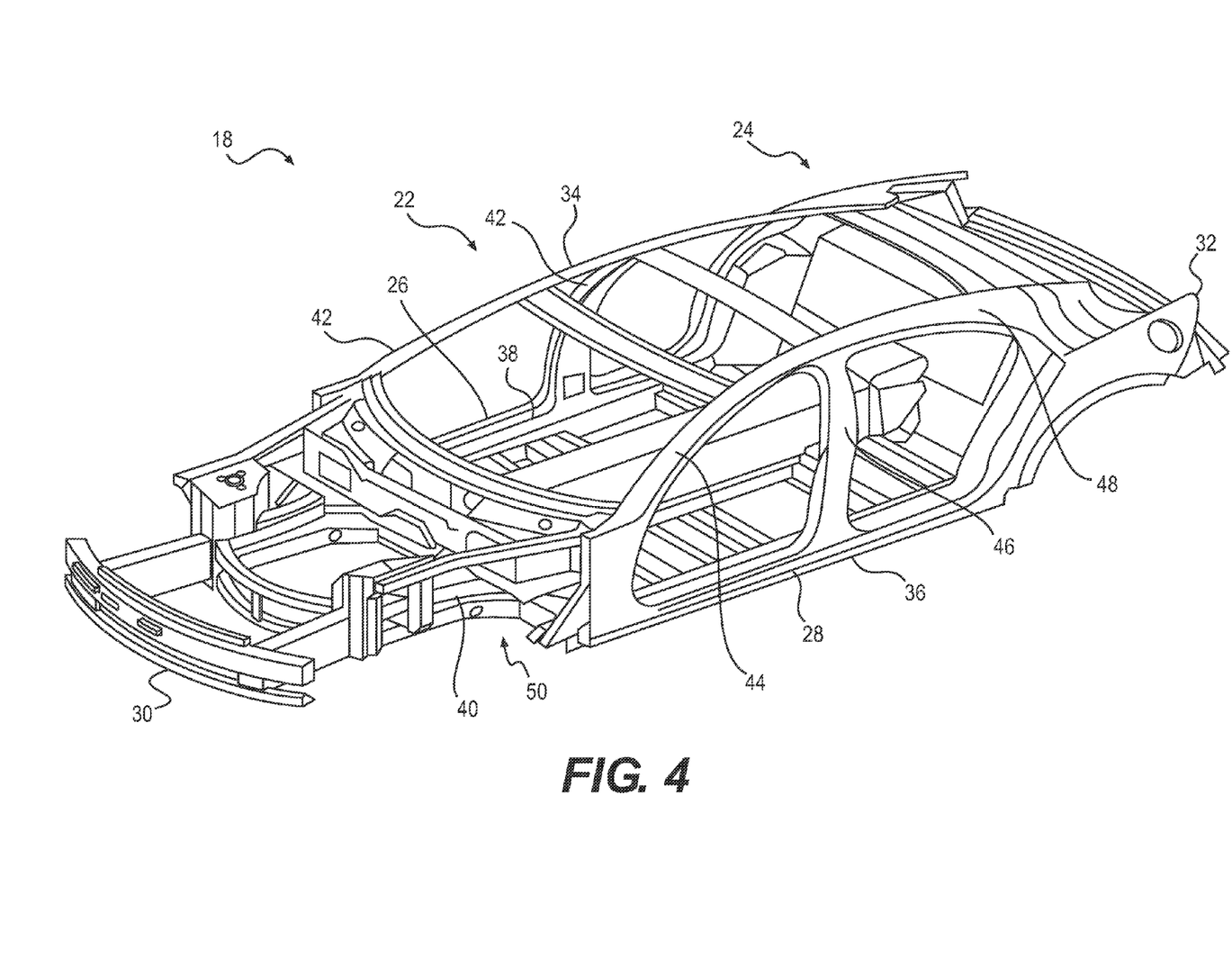
FIG. 4 is a perspective view of a vehicle space frame, according to various embodiments of the disclosure.

With reference to FIGS. 1-3, a hybrid electric vehicle (HEV) 10 having an electric propulsion system and exhaust system 12 (e.g., refer to FIG. 5) is shown. The vehicle 10 includes a plurality of tail pipes or outlet pipes 14, 16 that are components of the exhaust system 12. While the vehicle shown is a 2-door sedan, it should be understood that vehicle may be any type of vehicle, such as a mini-van, sport utility vehicle, or the like. Although the exhaust system of the present disclosure has been described for use with a HEV, it is also contemplated that the exhaust may also be used in vehicles having other propulsion systems, such as, combustion engines that are carbon-based, based on alternative fuel, or the like, electric vehicles, or the like.

The dual outlet pipes 14, 16 are located on each side of the lower front portion of the vehicle 10. Although the exhaust system 12 and outlet pipes 14, 16 shown are located at the sides and front lower portion of the vehicle 10, it is also contemplated that the exhaust system 12 and outlet pipes 14, 16 can be located elsewhere on the vehicle 10, such as the rear portion of vehicle, or the like, and have other orientations.

With reference to FIGS. 1-4, a vehicle space frame 18 for the vehicle 10 according to an exemplary embodiment is shown. The vehicle space frame 18 includes a forward (front) frame portion 20, a middle frame portion 22, and a rearward (rear) frame portion 24. The vehicle space frame 18 also includes a first side member 26, a second side member 28, a front side member 30, a rear side member 32, and upper (top) side surface 34, and a lower (bottom) side surface 36. A first and second laterally spaced, longitudinally extending lower side rail members 38, 40 are disposed on the first and second sides 26, 28 of the lower side 36 of vehicle space frame 18 and extend the length thereof. The lower (bottom) side 36 of the vehicle space frame 18 is joined to the upper (top) side surface 34 of the vehicle space frame 18 by a plurality of vertical support members 42 (e.g., structures, pillars, columns, etc.). These vertical support members 42 may include a pair of first vertical support members (or A-Pillars) 44, a pair of second vertical support members (or B-Pillars) 46, a pair of third vertical support members (or C-Pillars) 48, or the like. The front frame portion 20, the middle frame portion 22 and the rear frame portion 24 each have a substantially box-like (or cage-like) structure that are joined together to form the vehicle space frame 18 also having a substantially box-like (or cage-like) structure. The vehicle space frame 18 also includes a plurality of openings or areas 50 for attaching other vehicle components thereto, such as, the exhaust system 12 (refer to FIG. 5), engines, drive trains, body parts, body side assemblies, or the like. The body side assemblies may include floor pans, roofs, fenders, body panels, hood and trunk lids, doors, or the like.

Referring now to FIGS. 1-7, the exhaust system 12 and components thereof are shown. The exhaust system 12 generally includes a main exhaust pipe 51, a first and second intermediate exhaust pipe 52a, 52b, a first and second muffler 54, 56, an exhaust pipe member (Y-pipe) 58, a flex-coupler 60, and a first and second outlet pipe 14, 16, which are described in further detail below.

Figure 5:
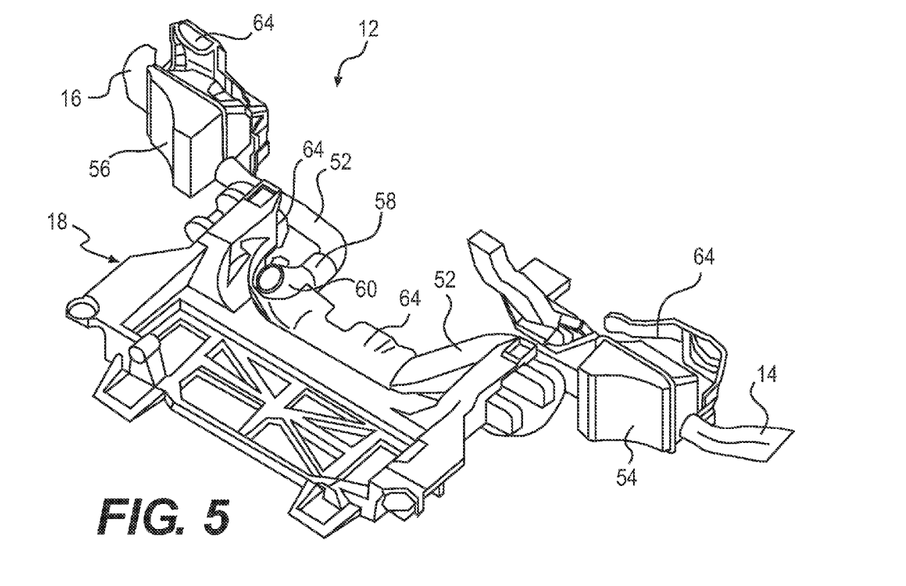
FIG. 5 is a top perspective view of an exhaust system for a hybrid electric vehicle, according to various embodiments of the disclosure.
Figure 7:
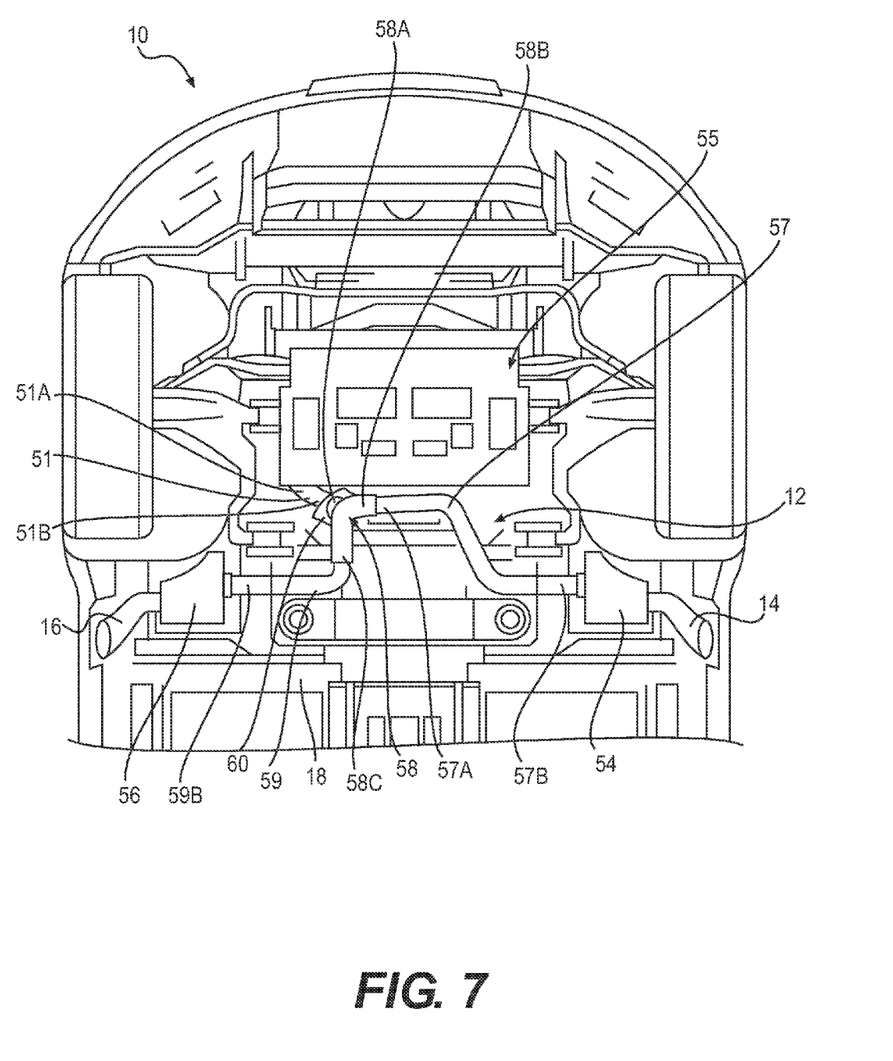
FIG. 7 is a partial bottom view of a hybrid electric vehicle including an exhaust system, according to various embodiments of the disclosure.

The exhaust system 12 includes a main exhaust pipe 51 that includes a first end 51a and a second end 51b. The main exhaust pipe first end 51a is connected to an engine 55 of the vehicle 10. The main exhaust pipe second end 51b is connected to an exhaust pipe member 58.

Figure 6:
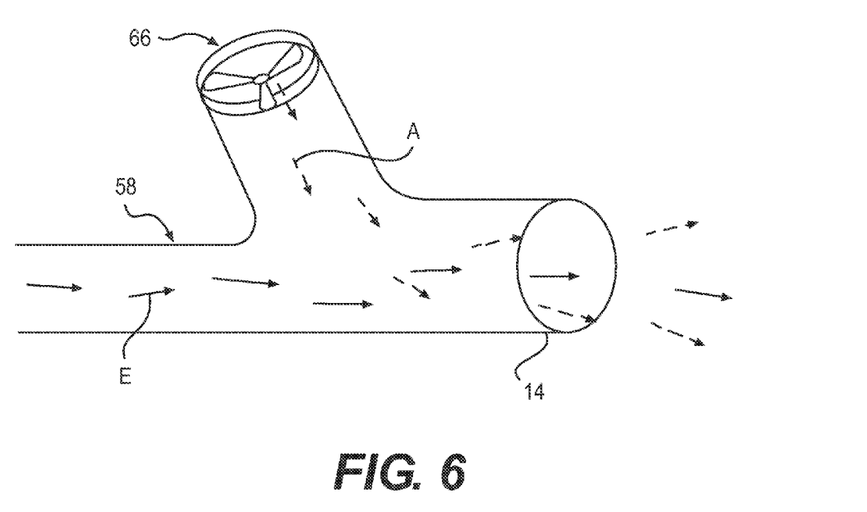
FIG. 6 is a diagram of the Y-pipe of FIG. 5, according to various embodiments of the disclosure.

The exhaust pipe member 58 splits the exhaust into two or more channels. The exhaust pipe member 58 may have a variety of shapes and sizes, such as V-shaped, T-shaped, or the like. In this example, the exhaust pipe member 58 is substantially Y-shaped and includes a first channel 58a that splits into a second channel 58b and a third channel 58c. The main exhaust pipe second end 51b is connected to the first channel 58a.

The exhaust system 12 also includes a plurality of interconnected intermediate exhaust pipes. In this example, there is a first intermediate exhaust pipe 57 and a second intermediate exhaust pipe 59. The first intermediate exhaust pipe 57 includes a proximate end 57a connected to the second channel 58b and a distal end 57b. Similarly, the second intermediate exhaust pipe 59 includes a proximate end 59a connected to the third channel 58c and a distal end 59b. The first intermediate exhaust pipe 57 extends outwardly from the exhaust pipe member 58 towards the first side of the vehicle 10 and the second intermediate exhaust pipe 59 extends outwardly from the exhaust pipe member 58 towards an opposed second side of the vehicle 10.

A first muffler 54 is coupled to the first intermediate exhaust pipe distal end 57b and a second muffler 56 is coupled to the second intermediate exhaust pipe distal end 59b. While two mufflers 54, 56 are included in the exhaust system 12, it is contemplated that any number of mufflers may be used. The first outlet pipe 14 is connected to the first muffler 54 and the second outlet pipe 16 is connected to the second muffler 56. The outlet pipes 14, 16 may be stylized and have a variety of shapes, sizes, surface features, textures, or the like, to enhance performance, aesthetic appearance, or the like. For example, the outlet pipes 14, 16 (and hence the exhaust stream) may be widened to prevent increased back pressure, or remain relatively narrow for increased exit velocity of the exhaust (E), or the like.

The exhaust system 12 may also include a flex-coupler 60 to isolate any movement of the engine 55 from the movement of the exhaust system 12 that may hinder performance and/or damage the exhaust system 12. The exhaust system 12 may also include an exhaust control system having a valve (not shown) in the Y-pipe 58 that selectively enables curbside exhaust. The exhaust system 12 may also include a fan 66 within the exhaust pipe member 58 that injects fresh air (A) into the exhaust system 12 to diffuse the exhaust (E) and enhance performance of the exhaust system 12. One or a plurality of heat shields 64 may also be coupled the exhaust system 12 to protect other vehicle components, such as the battery, or the like, from damage. The heat shields 64 may also be used to deflect heat, to decrease surface temperatures of vehicle components (such as the exhaust manifold), or the like. The heat shields 64 may be attached to the vehicle 10 (such as the space frame 18, other vehicle components, or the like) at strategic locations (e.g., adjacent the exhaust pipe member 58 and flex coupler 60, adjacent the first and second mufflers 54, 56, or the like) for optimum performance and heat protection. The exhaust system 12 may further include emission control devices to further enhance efficiency and performance of the exhaust system 12 and the vehicle 10. These emission control devices may include a catalytic converter, exhaust gas recirculation system, air injection system, computerized exhaust management system, or the like.

In operation, the main exhaust pipe 51 is connected to the exhaust pipe member 58 in a manner that enables the flow of exhaust from the exhaust system 12 to be split, emitted, expelled and otherwise diffused to either side of the vehicle 10 through the outlet pipes 14, 16. The two separate mufflers 54, 56 enhance performance of the system 12 and vehicle 10 by attenuating the sound emanating from the exhaust system 12. The first and second outlet pipes 14, 16 enable exhaust from the system 12 to exit to the side of the vehicle 10.

The exhaust system 12 is supported by and coupled to the space frame 18 or another part of the vehicle 10, such as other vehicle components, or the like, and secured thereto using conventional techniques, such as welding, fastening, bolting, or the like. The exhaust system 12 may be positioned anywhere on or in the vehicle 10. In this example, the exhaust system 12 is contained within the front portion of the vehicle 10, and more particularly, under the hood of the vehicle 10 in front of the passenger compartment. The exhaust system and components thereof may be fabricated from a variety of materials, such as, metal, composite material, plastic, heat resistant material, or the like.

By implementing the exhaust system 12 according to various embodiments, hot surface temperatures on vehicle components, such as the exhaust manifold, catalytic converter, or the like, may be significantly decreased. For example, hot surface temperatures on the exhaust manifold and catalytic converter may be decreased from 832° C. to 327° C. and from 865° C. to 471° C., respectively.

The muffling system of the exhaust system 12 disclosed in the present disclosure may be either active or passive and configured in a variety of ways. For example, adding more restriction within the passive mufflers can reduce sound power, but can decrease engine performance. Having less restriction in the mufflers can improve engine performance, but increase sound power. Creating a larger muffler can achieve less restriction and reduce sound power, but this would leave less space to package a plethora of other components, decrease thermal clearances, or cause change in vehicle proportions. As such, the exhaust system 12 of the present disclosure may be configured to utilize a combination of passive muffling, semi-active muffling, or active muffling to achieve improved and/or optimal engine performance and minimal sound power and also enhance manufacturing and packaging. According to one exemplary embodiment, an active system may be configured to include one or more acoustic drivers that cancel sound in the exhaust. A semi-active system may be configured to vary backpressure and restriction (such as with a valve to change the exhaust flow path, or the like) dynamically to achieve the desired engine performance and sound power.

With reference to FIGS. 1-3 and 8, an exhaust system 100, such as a cold-end exhaust system, is shown according to various embodiments of the disclosure. The exhaust system 100 may include a resonator 101 for dampening energy (e.g., sound waves) in the exhaust system 100. Exhaust (E) from an internal combustion engine 102 enters an inlet pipe 104 of the exhaust system 100 and flows into a first compartment 112 of muffler chamber 110. The chamber 110 may include three compartments: the first compartment 112, a second compartment 114, and a third compartment 116 defined by dividing baffles 132, 134.

Figure 8:
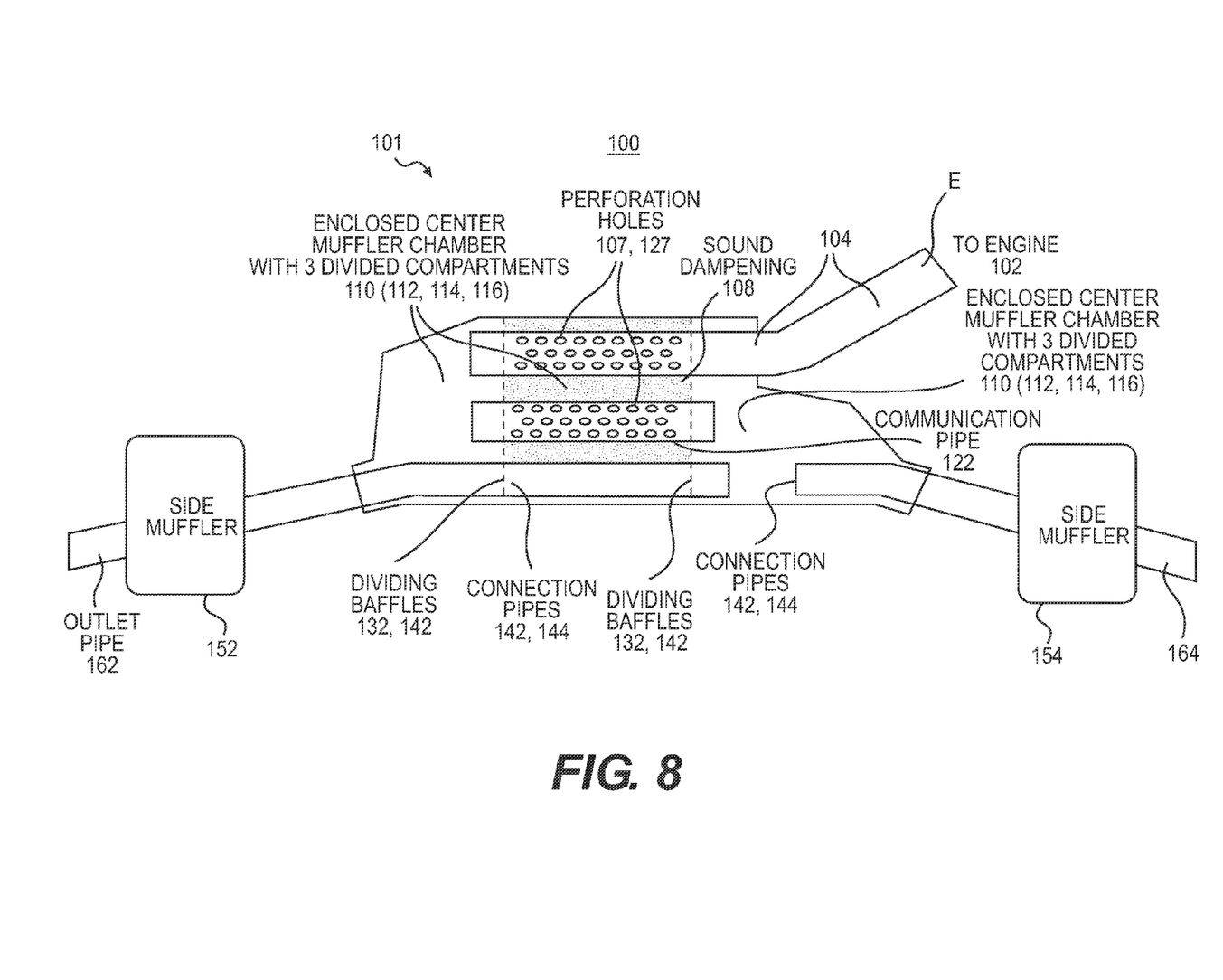
FIG. 8 is a diagram of an exhaust system according to various embodiments of the disclosure.
Figure 9:
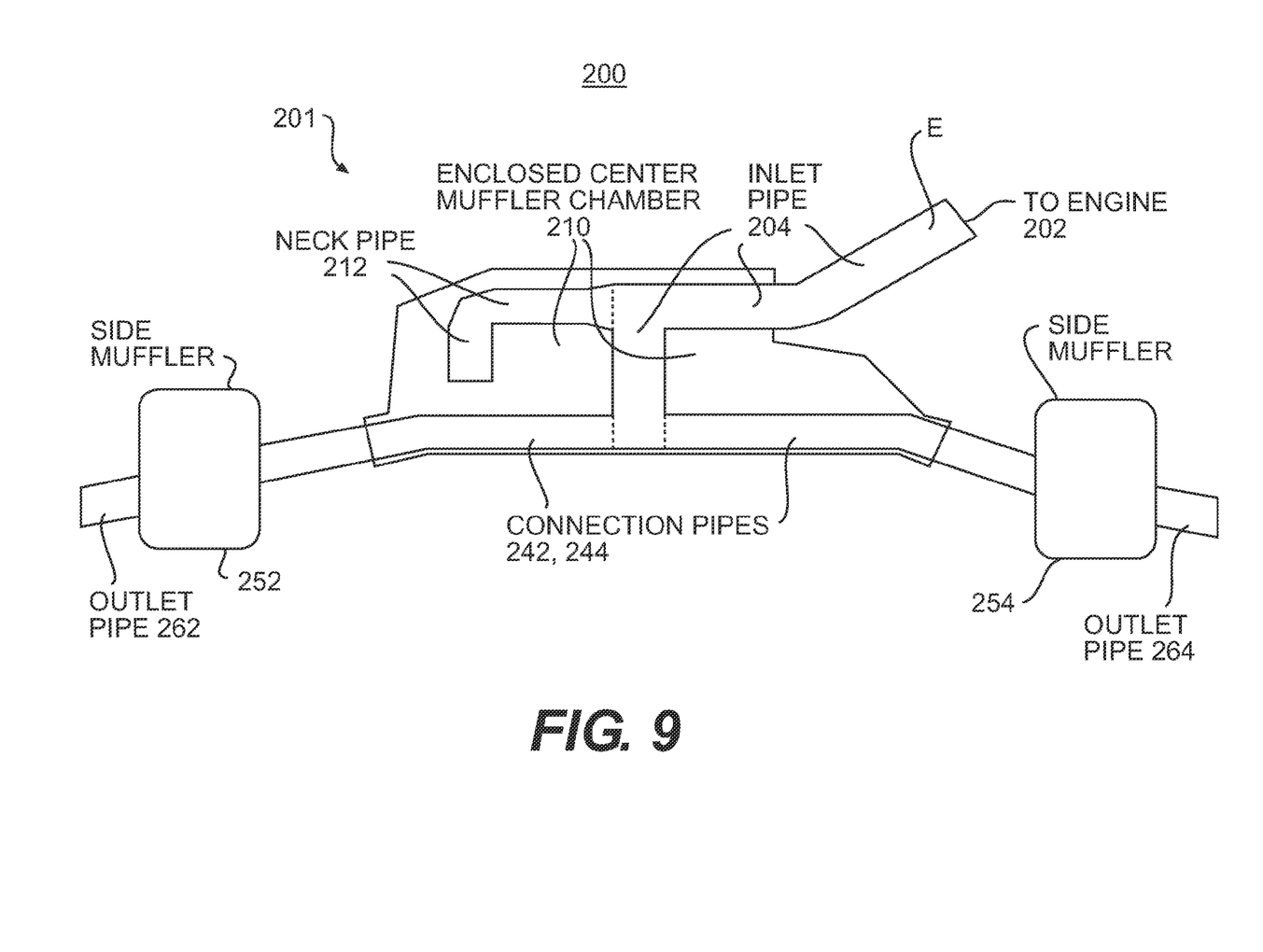
FIG. 9 is a diagram of an exhaust system according to various embodiments of the disclosure.

The exhaust expands in the first compartment 112 before entering a communication pipe 122. In addition, some of the exhaust leaks out of the inlet pipe 104 through perforated holes 107 and enters the second (center) compartment 114 of the muffler chamber 110. The exhaust flows through sound-dampening material 108, which effectively absorbs some acoustic energy in the exhaust in the second compartment 114 before entering the communication pipe 122 through perforation holes 127 on the communication pipe 122. The exhaust in the communication pipe 122 then flows into the third compartment 116. In the third compartment 116, the exhaust expands before entering connection pipes 142, 144. Each of the connection pipes 142, 144 directs exhaust outwardly to a respective side muffler 152, 154 arranged along sides of the vehicle 10. At the side mufflers 152, 154, the exhaust expands before going out to atmosphere via respective outlet pipes 162, 164.

With reference to FIGS. 1-3 and 9, an exhaust system 200, such as a cold-end exhaust system, is shown according to various embodiments of the disclosure. The exhaust system 200 may include a resonator 201 for dampening energy (e.g., sound waves) in the exhaust system 200. Exhaust (E) from an internal combustion engine 204 enters an inlet pipe 204 of the exhaust system 200. The exhaust flow is split into two when entering two connection pipes 242, 244. Each of the connection pipes 242, 244 directs exhaust outwardly to a respective side muffler 252, 254 arranged along sides of the vehicle 10. At the side mufflers 252, 254, the exhaust expands before going out to atmosphere via respective outlet pipes 262, 264. A neck pipe 212 is connected to the inlet pipe 204 allowing sound wave in the inlet pipe 204 to travel into an enclosed center muffler chamber 210. After expansion inside and bounding off against the walls of the enclosed center muffler chamber 210, the sound wave is allowed to travel back into the inlet pipe 204 to effectively cancel out some incoming sound wave of the gas.

The present disclosure has been described in an illustrative manner. It is to be understood that the terminology which has been used is intended to be in the nature of words of description rather than of limitation.

Many modifications and variations of the present disclosure are possible in light of the above teachings. Therefore, within the scope of the appended claim, the present disclosure may be practiced other than as specifically described.

What is claimed is:

1. An exhaust system for a vehicle with an internal combustion engine installed in a front engine bay of the vehicle, the exhaust system comprising:
   an inlet pipe having one end connected to an exhaust port of the internal combustion engine and a second end;
   a resonator including an enclosed muffler chamber having an interior volume;
   wherein the system is configured so that exhaust gas enters the resonator through the second end of the inlet pipe and exits the resonator through a first connection pipe and a second connection pipe;
   wherein the first connection pipe is arranged in the interior volume of the enclosed muffler chamber, the first connection pipe in communication with the second end of the inlet pipe so that at least a portion of the exhaust gas exiting the resonator through the first connection pipe does not enter the interior volume of the enclosed muffler chamber;
   wherein the second connection pipe is arranged in the interior volume of the enclosed muffler chamber, the second connection pipe in communication with the second end of the inlet pipe so that at least a portion of the exhaust gas exiting the resonator through the second connection pipe does not enter the interior volume of the enclosed muffler chamber;
   a neck pipe having a bend arranged in the interior volume of the enclosed muffler chamber, the neck pipe having a first end in communication with the inlet pipe, the neck pipe having a second end in communication with the interior volume of the enclosed muffler chamber;
   a first side muffler in communication with the second end of the first connection pipe; and
   a second side muffler in communication with the second end of the second connection pipe.

2. The exhaust system of claim 1, wherein the vehicle is a hybrid vehicle.

3. An exhaust system for a hybrid electric vehicle having a pair of front wheels and a pair of rear wheels, the exhaust system comprising:
   an exhaust pipe including a first channel having a first end coupled to an engine of the vehicle and second end that splits into a second channel that extends outwardly therefrom to a first front side of the vehicle and a third channel that extends outwardly therefrom to a second front side of the vehicle;
   a first intermediate exhaust pipe having a proximate end coupled to the second channel and a distal end having a first muffler coupled thereto and a second intermediate exhaust pipe having a proximate end coupled to the third channel and a distal end having a second muffler coupled thereto, wherein the first muffler is coupled to the first front side of the vehicle and the second muffler is coupled to the second front side of the vehicle;
   a first outlet pipe coupled to the first muffler and a second outlet pipe coupled to the second muffler; and
   at least one heat shield mounted to the exhaust system that deflects heat away from the vehicle thereby protecting the vehicle from heat damage;
   wherein the exhaust system is completely contained within a front end of the vehicle and in front of a passenger compartment of the vehicle such that the first and second outlet pipes expel exhaust to the first and second front sides of the front end of the vehicle at locations rearward of the front wheels and forward of a passenger compartment access door; wherein the exhaust pipe is substantially Y-shaped.

* * * * *